(12) United States Patent
Takahashi

(10) Patent No.: US 8,739,848 B2
(45) Date of Patent: Jun. 3, 2014

(54) PNEUMATIC TIRE

(75) Inventor: Toshihiko Takahashi, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 389 days.

(21) Appl. No.: 13/083,673

(22) Filed: Apr. 11, 2011

(65) Prior Publication Data

US 2011/0277894 A1 Nov. 17, 2011

(30) Foreign Application Priority Data

May 13, 2010 (JP) .................. 2010-111234

(51) Int. Cl.
*B60C 11/13* (2006.01)

(52) U.S. Cl.
USPC ............ 152/209.22; 152/209.15; 152/209.21

(58) Field of Classification Search
USPC ............ 152/209.15, 209.21, 209.22, 209.18
See application file for complete search history.

(56) References Cited

U.S. PATENT DOCUMENTS

| 3,055,410 A | 9/1962 | Caulkins | |
|---|---|---|---|
| 2002/0026972 A1 | 3/2002 | Ochi | |
| 2005/0000613 A1* | 1/2005 | Maruoka et al. | 152/209.1 |
| 2007/0251622 A1 | 11/2007 | Tomita | |
| 2008/0000565 A1* | 1/2008 | Tomita | 152/209.13 |
| 2010/0096054 A1 | 4/2010 | Kiwaki | |
| 2010/0252157 A1 | 10/2010 | Ito | |

FOREIGN PATENT DOCUMENTS

| DE | 102007016930 | * 10/2008 |
|---|---|---|
| EP | 1506884 | * 2/2005 |
| JP | 09-002024 | * 1/1997 |
| JP | 2002029224 | 1/2002 |
| JP | 2003-205707 | 7/2003 |
| JP | 2008222088 A | 9/2008 |
| WO | WO 2005/039895 | 5/2005 |
| WO | WO 2009/057780 | 5/2009 |

OTHER PUBLICATIONS

English machine translation of DE102007016930, dated Oct. 2008.*
Japanese Office Action issued on Sep. 20, 2013 by the Japanese Patent Office in corresponding Japanese Patent Application No. 2010-111234.

* cited by examiner

*Primary Examiner* — Steven D Maki
*Assistant Examiner* — Robert Dye
(74) *Attorney, Agent, or Firm* — Fish & Richardson P.C.

(57) ABSTRACT

A pneumatic tire has a first wall surface faces one side of a circumferential groove, and a second wall surface faces another side of that. The first wall surface alternately has a first inclined surface portion and a first concave portion. The second wall surface alternately has a second inclined surface portion and a second concave portion. A first land portion has a first connection portion connected to a second land portion and a first bottom surface portion constitutes the bottom of the circumferential groove. The second land portion has a second connection portion connected to the first land portion and a second bottom surface portion constitutes the bottom of the circumferential groove. The first inclined surface portion and the second inclined surface portion are alternately arranged along a tire circumferential direction overlapping with each other and a see-through region of the circumferential groove is formed between them.

17 Claims, 3 Drawing Sheets

PNEUMATIC TIRE

BACKGROUND OF THE INVENTION

1. Field of the Invention

The present invention relates to a pneumatic tire which can improve a wear performance and an on-road performance while retaining an off-road performance and a drainage performance.

2. Description of the Related Art

Generally, in a tire which is used in an off-road traveling, there is employed a block pattern provided with a lot of blocks on a tread surface, so that a traction (a traction force) can be achieved on a gravel road or a muddy place. However, on the contrary, in an on-road traveling, since the blocks tend to tilt and deform at a time of driving and braking or a time of cornering particularly in a case where a vehicle weight is large, the wear performance and the on-road performance (the on-road traveling performance) are hard to be sufficiently achieved. Further, in this kind of tire, it is important to suppress the occurrence of hydroplaning while retaining the drainage performance.

In Japanese Unexamined Patent Publication No. 2002-29224, there is described a pneumatic tire in which at least two block rows are comparted by a lateral groove, and a reinforcing portion connecting a side surface of the block on one side thereof and a bottom portion of the lateral groove is overlapped on the block on the other side in a tire width direction, for the purpose of achieving an off-road performance, a snow performance and an on-road performance. However, in this tire, although it is possible to support the block which tends to tilt in a tire circumferential direction by the reinforcing portion, it is insufficient for suppressing a tilting deformation in the tire width direction, so that it is not provided with a structure for improving the drainage performance, as well as it is impossible to improve a wear performance and the on-road performance at a cornering.

In Japanese Unexamined Patent Publication No. 2008-222088, there is described a pneumatic tire in which land portion row is constituted by alternately providing a first land portion and a second land portion which are comparted by a lateral groove in a tire circumferential direction, and a V-shaped groove is formed in the land portion row by overlapping an inclined surface portion of the first land portion and an inclined surface portion of the second land portion in a tire width direction. However, even in this tire, it is insufficient for suppressing a tilting deformation of a block in the tire width direction, and does not assume an off-road traveling, as a matter of course.

SUMMARY OF THE INVENTION

The present invention is made by taking the actual conditions mentioned above into consideration, and an object of the present invention is to provide a pneumatic tire which can improve a wear performance and an on-road performance, while retaining an off-road performance and a drainage performance.

The object can be achieved by the following present invention. That is, the present invention provides a pneumatic tire comprising a circumferential groove extending along a tire circumferential direction, a first land portion having a first wall surface which faces one side in a tire width direction of the circumferential groove, and a second land portion having a second wall surface which faces another side in the tire width direction of the circumferential groove, the circumferential groove, the first land portion and the second land portion being provided in a tread surface, the first wall surface alternately having along the tire circumferential direction a first inclined surface portion which is gradually decreased in a height thereof toward the second land portion and runs into a bottom of the circumferential groove, and a first concave portion which is depressed in a direction away from the second land portion, the second wall surface alternately having along the tire circumferential direction a second inclined surface portion which is gradually decreased in a height thereof toward the first land portion and runs into the bottom of the circumferential groove, and a second concave portion which is depressed in a direction away from the first land portion, the first land portion having a first connection portion which enters the second concave portion and is gradually increased in a height thereof toward the second land portion so as to be integrally connected to the second land portion, and a first bottom surface portion which is interposed between the first inclined surface portion and the first connection portion and constitutes the bottom of the circumferential groove, the second land portion having a second connection portion which enters the first concave portion and is gradually increased in a height thereof toward the first land portion so as to be integrally connected to the first land portion, and a second bottom surface portion which is interposed between the second inclined surface portion and the second connection portion and constitutes the bottom of the circumferential groove, and the first inclined surface portion and the second inclined surface portion being alternately arranged along the tire circumferential direction while overlapping with each other in the tire width direction, and a see-through region of the circumferential groove being formed between the first inclined surface portion and the second inclined surface portion.

In the pneumatic tire in accordance with the present invention, since the first wall surface alternately has the first inclined surface portion and the first concave portion along the tire circumferential direction, and the second wall surface alternately has the second inclined surface portion and the second concave portion along the tire circumferential direction, a lot of edge components in the circumferential direction and the lateral direction are arranged in the tread surface. Accordingly, it is possible to enhance a traction so as to retain an off-road performance.

Further, when the first land portion tends to tilt in the tire circumferential direction, the first inclined surface portion comes into contact with the second inclined surface portion so as to be supported, and the first land portion comes into contact with the second connection portion so as to be supported, so that it is possible to suppress the tilting deformation of the first land portion. And, when the first land portion tends to tilt in the tire width direction, the first inclined surface portion and the second connection portion suppress the tilt of the first land portion, and since the first land portion is integrally connected to the second land portion via the first connection portion, it is possible to suppress the tilting deformation of the first land portion. The same applies to a case where the second land portion tends to tilt in the tire circumferential direction or the tire width direction. Accordingly, it is possible to suppress the tilting deformation of the first land portion and the second land portion at a time of driving, braking or cornering whereby it is possible to improve the wear performance and the on-road performance.

Further, since the see-through region of the circumferential groove is formed between the first inclined surface portion and the second inclined surface portion, it is possible to suppress the occurrence of hydroplaning while retaining the drainage performance. The see-through region of the circumferential groove refers to a region in the circumferential groove which can be seen through without being blocked by right and left wall surfaces at a time of viewing the circumferential groove in the tire circumferential direction. As mentioned above, in accordance with the pneumatic tire of the present invention, it is possible to improve the wear performance and the on-road performance while retaining the off-road performance and the drainage performance.

In the present invention, it is preferable that the first inclined surface portion and the second inclined surface portion overlap with each other at a position equal to or more than 50% of a depth of the circumferential groove from a tread surface. Accordingly, the see-through region of the circumferential groove is enlarged, and it is possible to well retain the drainage performance by preventing the circumferential groove from becoming shallow or disappearing in an early stage due to a wear. In order to enhance the operation and effect mentioned above, it is more preferable that the first inclined surface portion and the second inclined surface portion overlap with each other at a position equal to or more than 80% of the depth of the circumferential groove from the tread surface.

In the present invention, it is preferable that the first bottom surface portion enters the second concave portion which gradually tapers as being away from the first land portion, the first connection portion is provided at a leading end of the second concave portion, the second bottom surface portion enters the first concave portion which gradually tapers as being away from the second land portion, and the second connection portion is provided at a leading end of the first concave portion.

Since the first concave portion and the second concave portion are formed in the tapered shape as mentioned above, it is possible to suppress a reduction of a rigidity of the first land portion and the second land portion, thereby efficiently improving the wear performance and the on-road performance. Further, it is possible to widen the first bottom surface portion and the second bottom surface portion so as to increase the radius of curvature of the bottom of the circumferential groove by providing the first concave portion and the second concave portion, and since the groove bottom is formed discontinuously, it becomes easy to suppress the generation of the crack (the groove crack).

In the present invention, it is preferable that the first land portion and the second land portion are constituted by a block which is comparted by a lateral groove. In this case, it is possible to improve the off-road performance by the edge components of the lateral grooves.

In the present invention, it is preferable that the tread surface is provided with a pair of circumferential grooves each extending in a zigzag shape, and the first land portion and the second land portion are arranged between the pair of circumferential grooves. In accordance with the structure mentioned above, it is possible to improve the off-road performance by the edge components of the pair of circumferential grooves extending in the zigzag shapes, and the drainage performance can be retained by the circumferential groove between the first land portion and the second land portion.

DETAILED DESCRIPTION OF THE PREFERRED EMBODIMENTS

Figure 1:
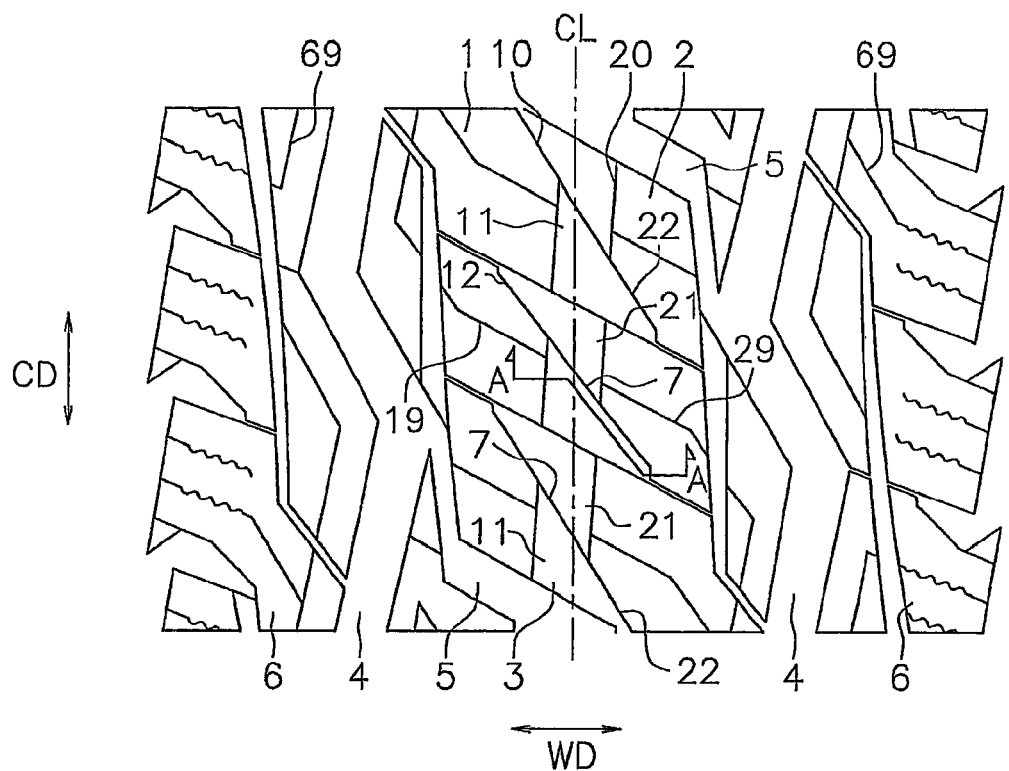
FIG. 1 is a plan view showing an example of a tread surface of the pneumatic tire of the present invention.

An embodiment of the present invention will be explained with reference to the drawings. As shown in FIG. 1, a tread surface of a pneumatic tire in accordance with the present embodiment is provided with a circumferential groove 3 extending along a tire circumferential direction CD, a first land portion 1 having a first wall surface 10 which faces one side (a left side in FIG. 1) in a tire width direction WD of the circumferential groove 3, and a second land portion 2 having a second wall surface 20 which faces the other side (a right side in FIG. 1) in the tire width direction WD of the circumferential groove 3.

The first land portion 1 and the second land portion 2 are comparted by the circumferential groove 3, and a pair of circumferential grooves 4 which are provided in both sides of a tire equator plane CL. A lateral groove 5 is provided between the pair of circumferential grooves 4 in such a manner as to communicate them with each other, and each of the first land portion 1 and the second land portion 2 is constituted by blocks which are comparted in the tire circumferential direction by the lateral groove 5. A shoulder land portion 6 is provided on an outer side of each of the circumferential grooves 4, and sipes 19, 29 and 69 are formed respectively in the first land portion 1, the second land portion 2 and the shoulder land portions 6, in order to increase edge components to enhance an off-road performance and a snow performance.

Figure 2:
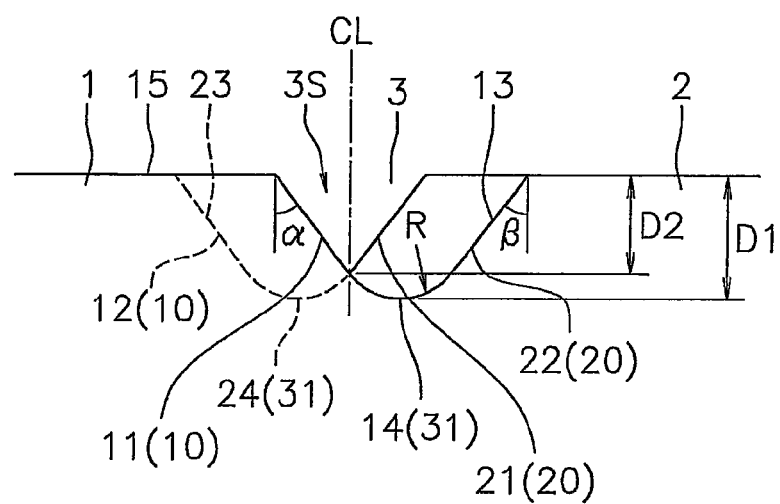
FIG. 2 is a cross sectional view as seen from an arrow A-A of the tread surface in FIG. 1.
Figure 3:
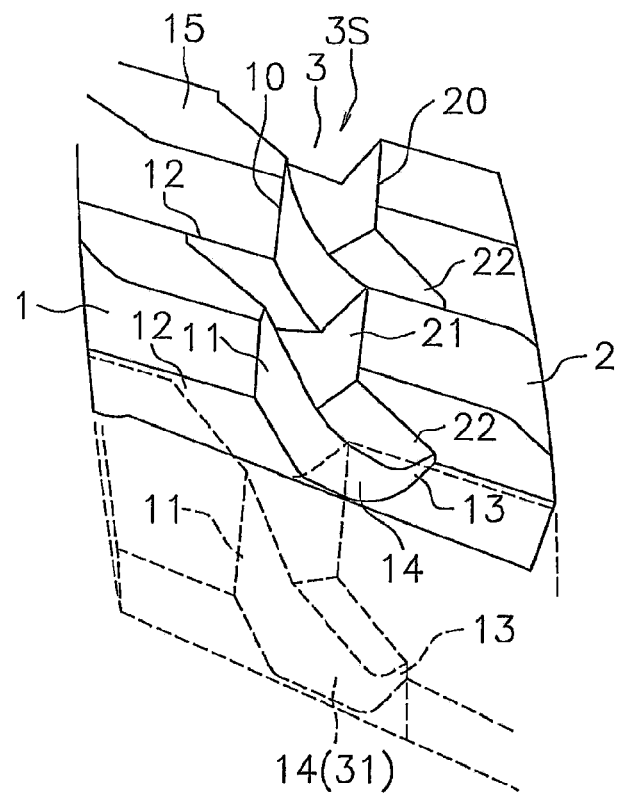
FIG. 3 is a perspective view showing a substantial part of the tread surface in FIG. 1.
Figure 4:
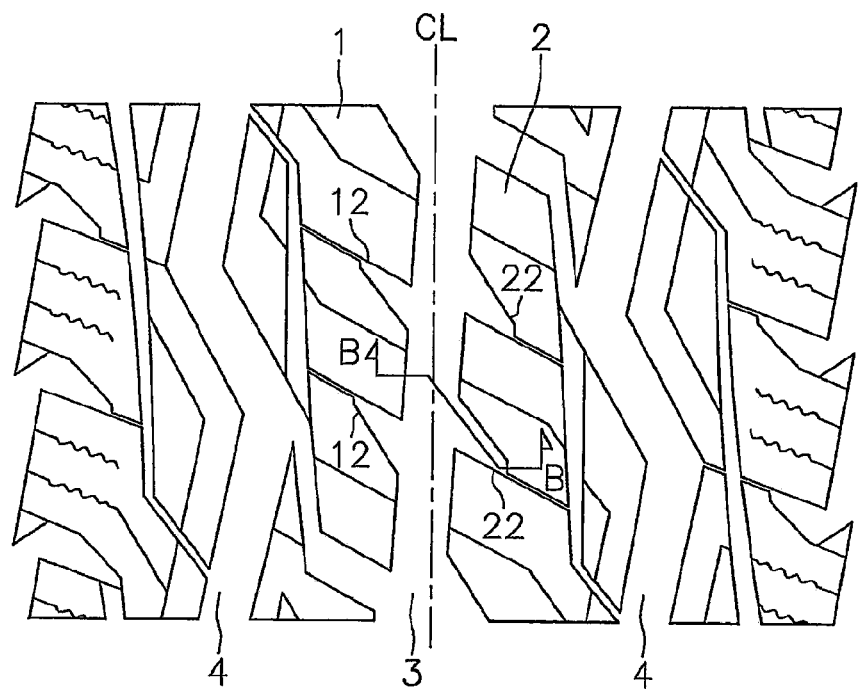
FIG. 4 is a plan view showing a tread surface in a first comparative example.
Figure 5:
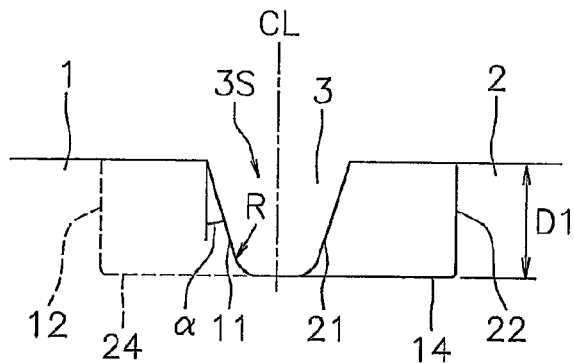
FIG. 5 is a cross sectional view as seen from an arrow B-B of the tread surface in FIG. 4.
Figure 6:
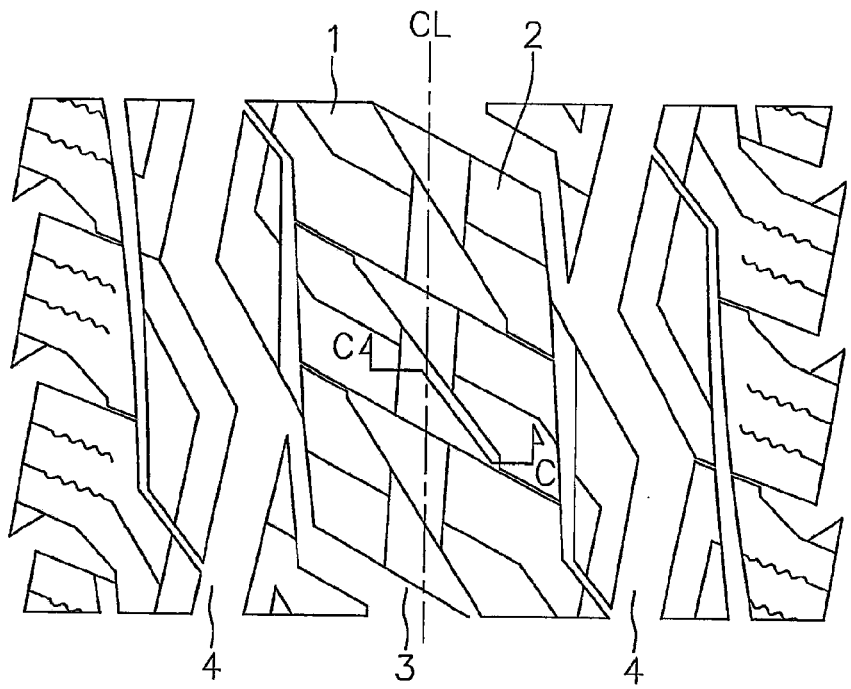
FIG. 6 is a plan view showing a tread surface in a second comparative example.
Figure 7:
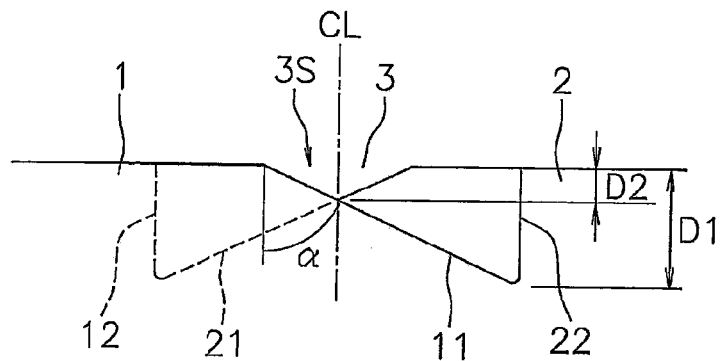
FIG. 7 is a cross sectional view as seen from an arrow C-C of the tread surface in FIG. 6.

As shown in FIGS. 1 to 3, the first wall surface 10 has alternately along the tire circumferential direction first inclined surface portions 11 each of which runs into a groove bottom 31 of the circumferential groove 3 while gradually decreasing its height toward the second land portion 2, and first concave portions 12 each of which is depressed in a direction away from the second land portion 2. In the same way, the second wall surface 20 has alternately along the tire circumferential direction second inclined surface portions 21 each of which runs into the groove bottom 31 of the circumferential groove 3 while gradually decreasing its height toward the first land portion 1, and second concave portions 22 each of which is depressed in a direction away from the first land portion 1. Accordingly, a lot of edge components in the circumferential direction and the lateral direction are arranged in the tread surface, and it is possible to enhance a traction so as to retain the off-road performance.

The first land portion 1 has first connection portions 13 each of which enters the second concave portion 22 and is integrally connected to the second land portion 2 while gradually increasing its height toward the second land portion 2, and first bottom surface portions 14 each of which is interposed between the first inclined surface portion 11 and the first connection portion 13 and constitutes a groove bottom 31 of the circumferential groove 3. In the same way, the second land portion 2 has second connection portions 23 each of which enters the first concave portion 12 and is integrally connected to the first land portion 1 while gradually increasing its height toward the first land portion 1, and second bottom surface portions 24 each of which is interposed between the second inclined surface portion 21 and the second connection portion 23 and constitutes a groove bottom 31 of the circumferential groove 3.

Further, the first inclined surface portions 11 and the second inclined surface portions 21 are alternately arranged along the tire circumferential direction CD while overlapping in the tire width direction WD, and a see-through region 3S of the circumferential groove 3 is formed between the first inclined surface portions 11 and the second inclined surface portions 21, as shown in FIGS. 2 and 3. In other words, the circumferential groove 3 is structured such that portions each constituted by the first inclined surface portion 11, the first connection portion 13 and the first bottom surface portion 14, and portions each constituted by the second inclined surface portion 21, the second connection portion 23 and the second bottom surface portion 24 are alternately connected in the tire circumferential direction CD. In accordance with the structure mentioned above, it is possible to suppress the occurrence of hydroplaning while retaining a drainage performance.

When the first land portion 1 tends to tilt in the tire circumferential direction CD, the first inclined surface portion 11 comes into contact with the second inclined surface portion 21 so as to be supported, and the first land portion 1 comes into contact with the second connection portion 23 so as to be supported, so that it is possible to suppress the tilting deformation of the first land portion 1. In the tire, since the first inclined surface portions 11 and the second inclined surface portions 21 are alternately arranged in the tire circumferential direction CD, the first inclined surface portion 11 which does not face the lateral groove 5 is firmly supported from both sides by the second inclined surface portions 21, and it is possible to effectively suppress a tilting deformation. When the second land portion 2 tends to tilt in the tire circumferential direction CD, the tilting deformation of the second land portion 2 is suppressed in the same manner.

Further, when the first land portion 1 tends to tilt in the tire width direction WD, the first inclined surface portion 11 and the second connection portion 23 suppress the tilt of the first land portion 1, and since the first land portion 1 is integrally connected to the second land portion 2 via the first connection portion 13, it is possible to suppress the tilting deformation of the first land portion 1. Also in a case where the second land portion 2 tilts in the tire width direction WD, the tilting deformation is suppressed in the same manner. Accordingly, it is possible to suppress the tilting deformation of the first land portion 1 and the second land portion 2 at a time of driving, braking or cornering whereby it is possible to improve the wear performance and the on-road performance.

In the present embodiment, the first land portion 1 and the second land portion 2 are arranged between the pair of circumferential grooves 4 which are positioned on outermost sides in the tire width direction, and it is possible to suppress the tilting of the land portion while increasing the edge components in the center region of the tread surface. Accordingly, the traction can be effectively enhanced, and contributes to an improvement of an off-road performance and an snow performance. Further, the center region highly contributes to the driving and braking performance, and is advantageous for improving a starting performance and a braking performance on the on-road. Furthermore, since the circumferential groove 3 passes on the tire equator plane CL and the see-through region 3S is continuous in the tire circumferential direction CD, it is possible to effectively suppress the occurrence of hydroplaning.

FIG. 2 shows a depth D1 of the circumferential groove 3 and a depth position D2 in which the inclined surface portions 11 and 21 overlap with each other. In the light of well retaining the drainage performance, it is preferable that the first inclined surface portion 11 and the second inclined surface portion 21 partly overlap with each other. Specifically, it is preferable to overlap at a position which is equal to or more than 50% of the depth D1 of the circumferential groove 3 from the tread surface (D2/D1≧50%), a position which is equal to or more than 80% is more preferable (D2/D1≧80%), and a position which is more than 80% is further preferable (D2/D1>80%). Further, in order to suppress the tilting deformation of the first land portion 1 and the second land portion 2, a relationship D2/D1≦85% is preferable. In the present embodiment, the depth of the lateral groove 5 is set larger than the depth D1.

In the circumferential groove 3, since the first inclined surface portions 11 and the second inclined surface portions 21 overlap with each other in the tire width direction WD, the groove bottom 31 is discontinuously formed between the first bottom surface portion 14 and the second bottom surface portion 24. Accordingly, a groove crack generated in the groove bottom 31 in one of the first bottom surface portion 14 and the second bottom surface portion 24 does not continue to the groove bottom 31 in the other one, and it is possible to securely suppress a growth of the groove crack.

In the present embodiment, the first bottom surface portion 14 enters the second concave portion 22 which gradually tapers as being away from the first land portion 1, the first connection portion 13 is provided at a leading end of the second concave portion 22. In the same way, the second bottom surface portion 24 enters the first concave portion 12 which gradually tapers as being away from the second land portion 2, and the second connection portion 23 is provided at a leading end of the first concave portion 12. Accordingly, it is possible to suppress the reduction of the rigidity of the first land portion 1 and the second land portion 2, it is also possible to increase a radius of curvature R of the groove bottom 31 while widening the first bottom surface portion 14 and the second bottom surface portion 24, and the groove bottom 31 is formed discontinuously. Therefore, the generation of the groove crack can be easily suppressed.

The first inclined surface portion 11 is gradually decreased in its height from a top surface portion 15 of the first land portion 1 toward the second land portion 2, and an angle of incline α with respect to a normal line of the tread surface passing through a ridge line between the top surface portion 15 and the first inclined surface portion 11 is preferably from 30 to 50 degrees. Accordingly, it is easy to support the first land portion 1, and it is also possible to effectively suppress the groove crack by increasing the radius of curvature R of the groove bottom 31. For the same reason, an angle of incline β of the first connection portion 13 is preferably within the range mentioned above, and the same is true with the second inclined surface portion 21 and the second connection portion 23.

As shown in FIG. 1, in the present embodiment, an interface 7 between the first land portion 1 and the second land portion 2 which transverse the circumferential groove 3 is inclined with respect to the tire circumferential direction CD, and the first inclined surface portion 11 and the second inclined surface portion 21 overlap also in the tire circumferential direction CD in the interface 7. Accordingly, when the first land portion 1 tilts in the tire width direction WD, the second inclined surface portion 21 may act in such a manner as to suppress the tilting of the first land portion 1 via the first inclined surface portion 11, and when the second land portion 2 tilts in the tire width direction WD, the first inclined surface portion 11 may act in such a manner as to suppress the tilting of the second land portion 2 via the second inclined surface portion 21.

In this tread surface, since the first land portion 1 and the second land portion 2 are constituted by the blocks which are comparted by the lateral grooves 5, it is possible to improve the off-road performance by the edge components of the lateral grooves 5. Generally, there is such a tendency that the tilting in the tire circumferential direction becomes larger in the block in comparison with the rib, however, in accordance with the pneumatic tire of the present invention, it is possible to appropriately improve the wear performance and the on-road performance by suppressing the tilting deformation of the first land portion 1 and the second land portion 2 as mentioned above.

Further, since the tread surface is provided with the pair of circumferential grooves 4 each extending in a zigzag shape, it is possible to improve the off-road performance even by the edge components formed by the zigzag shapes. Generally, in a circumferential groove in a zigzag shape, there is such a tendency that a drainage efficiency is lowered in comparison with a circumferential groove in a straight shape. However, in accordance with the tire of the present embodiment, since the see-through region 3S in the straight shape as mentioned above is formed between the first wall surface 10 and the second wall surface 20, it is possible to well retain the drainage performance.

In the present embodiment, there is shown the example in which the first land portion 1 and the second land portion 2 are arranged in the center region between the pair of circumferential grooves 4 which are positioned on the outermost sides in the tire width direction. However, they may be arranged in a shoulder region on an outer side of the circumferential groove 4. Since the shoulder region highly contributes to the cornering performance, such a case is advantageous for improving the cornering performance on the on-road.

Since the pneumatic tire in accordance with the present invention can improve the wear performance and the on-road performance while retaining the off-road performance and the drainage performance as mentioned above, it is particularly useful as a tire which is installed to a light truck such as a pickup truck, a sport utility vehicle (SUV), or the like.

EXAMPLE

An example tire which concretely shows the structure and effect of the present invention will be explained. In each of the following performance evaluations, each test tire (tire size: LT265/70R17) was assembled to a rim of 17×7.5 JJ so as to be installed to a foreign-made utility truck, and a pneumatic pressure was set to 420 kPa in a front tire and 520 kPa in a rear tire. In each of the items, an evaluation is made by an index number while a result of a first comparative example being set to 100, the larger numerical value indicates the more excellent performance.

(1) Off-road Performance

A start performance, a rectilinear propagation performance, a cornering performance and a braking performance on an unpaved road test course were comprehensively evaluated through a subjective evaluation by two drivers.

(2) Drainage Performance

A speed at which a hydroplaning phenomenon occurs was measured by traveling on a road surface having a water depth of 8 mm.

(3) On-road Performance

A start performance, a rectilinear propagation performance, a cornering performance and a braking performance on a dry paved road test course were comprehensively evaluated through a subjective evaluation by two drivers.

(4) Wear Performance

After traveling on a general road as long as 12000 km, an amount of wear in a center portion of a tread surface of a tire installed to a rear wheel was measured, and an inverse number thereof was calculated.

(5) Groove Crack Performance

After traveling on a general road as long as 50000 km, a length and a depth were measured in each of cracks which are generated in a groove bottom of a tire installed to a front wheel, and an inverse number was calculated by totally summing products thereof.

Tread patterns in a first comparative example, a second comparative example and an example are respectively shown in FIGS. 4 and 5, FIGS. 6 and 7, FIGS. 1 to 3. The first comparative example has the same structure as that of the example except the fact that the inclined surface portions 11 and 21 are not overlapped with each other and the connection portion is not provided in the land portions 1 and 2. The second comparative example has the same structure as that of the example except the fact that the bottom surface portion and the connection portion are not provided in the land portions 1 and 2. Dimensions of the respective examples are shown in Table 1, and results of evaluation are shown in Table 2.

TABLE 1

|  | Angle of incline α (°) | Radius of curvature R (mm) | Groove depth D1 (mm) | Overlap position D2 (mm) | D2/D1 |
|---|---|---|---|---|---|
| First Comparative Example | 15 | 3 | 12.8 | — | — |
| Second Comparative Example | 65 | — | 12.8 | 3.5 | 27% |
| Example | 35 | 5 | 12.8 | 10.2 | 80% |

TABLE 2

|  | Off-road performance | Drainage performance | Wear performance | On-road performance | Snow performance | Groove crack performance |
|---|---|---|---|---|---|---|
| First Comparative Example | 100 | 100 | 100 | 100 | 100 | 100 |
| Second | 96 | 88 | 106 | 102 | 94 | 120 |

TABLE 2-continued

|  | Off-road performance | Drainage performance | Wear performance | On-road performance | Snow performance | Groove crack performance |
|---|---|---|---|---|---|---|
| Comparative Example |  |  |  |  |  |  |
| Example | 106 | 98 | 110 | 108 | 104 | 115 |

As shown in Table 2, in the first comparative example, the wear performance and the on-road performance are lowered, and it is recognized that the tilting deformation of the land portion cannot be suppressed. Further, it is found that the groove crack is significantly generated. In the second comparative example, the off-road performance and the drainage performance cannot be retained, and the wear performance and the on-road performance are not sufficient. On the contrary, in the example, it is possible to improve the wear performance and the on-road performance while retaining the off-road performance and the drainage performance, and it is further possible to excellently achieve the snow performance and the groove crack performance.

What is claimed is:

1. A pneumatic tire comprising:
a circumferential groove extending along a tire circumferential direction, a first land portion having a first wall surface which faces one side in a tire width direction of the circumferential groove, and a second land portion having a second wall surface which faces another side in the tire width direction of the circumferential groove, the circumferential groove, the first land portion and the second land portion being provided in a tread surface,
the first wall surface alternately having along the tire circumferential direction a first inclined surface portion which is gradually decreased in a height thereof toward the second land portion and runs into a bottom of the circumferential groove, and a first concave portion which is depressed in a direction away from the second land portion,
the second wall surface alternately having along the tire circumferential direction a second inclined surface portion which is gradually decreased in a height thereof toward the first land portion and runs into the bottom of the circumferential groove, and a second concave portion which is depressed in a direction away from the first land portion,
the first land portion having a first connection portion which enters the second concave portion and is gradually increased in a height thereof toward the second land portion so as to be integrally connected to the second land portion, and a first bottom surface portion which is interposed between the first inclined surface portion and the first connection portion and constitutes the bottom of the circumferential groove,
the second land portion having a second connection portion which enters the first concave portion and is gradually increased in a height thereof toward the first land portion so as to be integrally connected to the first land portion, and a second bottom surface portion which is interposed between the second inclined surface portion and the second connection portion and constitutes the bottom of the circumferential groove,
the first inclined surface portion and the second inclined surface portion being alternately arranged along the tire circumferential direction while overlapping with each other in the tire width direction, and a see-through region of the circumferential groove being formed between the first inclined surface portion and the second inclined surface portion, and
the bottom of the circumferential groove being formed discontinuously between the first bottom surface portion and the second bottom surface portion,
wherein an inclination angle $\beta$ of the first connection portion with respect to a direction normal to the tread surface passing through a ridge line between a top surface portion of the second land portion and the first connection portion is from 30 degrees to 50 degrees, and
an inclination angle $\alpha$ of the second connection portion with respect to a direction normal to the tread surface passing through a ridge line between a top surface portion of the first land portion and the second connection portion is from 30 degrees to 50 degrees.

2. The pneumatic tire according to claim 1, wherein the first inclined surface portion and the second inclined surface portion overlap with each other at a position equal to or more than 50% of a depth of the circumferential groove from a tread surface.

3. The pneumatic tire according to claim 1, wherein the first inclined surface portion and the second inclined surface portion overlap with each other at a position equal to or more than 80% of a depth of the circumferential groove from a tread surface.

4. The pneumatic tire according to claim 1, wherein the first bottom surface portion enters the second concave portion which gradually tapers as being away from the first land portion, the first connection portion is provided at a leading end of the second concave portion, the second bottom surface portion enters the first concave portion which gradually tapers as being away from the second land portion, and the second connection portion is provided at a leading end of the first concave portion.

5. The pneumatic tire according to claim 1, wherein the first land portion and the second land portion are constituted by a block which is comparted by a lateral groove.

6. The pneumatic tire according to claim 1, wherein the tread surface is provided with a pair of circumferential grooves each extending in a zigzag shape, and the first land portion and the second land portion are arranged between the pair of circumferential grooves.

7. The pneumatic tire according to claim 1, wherein the first inclined surface portion and the second inclined surface portion are arranged close to each other in the tire circumferential direction so as to be positioned to come into contact with each other.

8. The pneumatic tire according to claim 1, wherein the first concave portion is depressed from a ridge line between a top surface portion of the first land portion and the first inclined surface portion in a direction away from the second land portion, and
the second concave portion is depressed from a ridge line between a top surface portion of the second land portion and the second inclined surface portion in a direction away from the first land portion.

9. The pneumatic tire according to claim 1, wherein the first inclined surface portion and the second inclined surface portion are adjacent to each other in the tire circumferential direction without the bottom of the circumferential groove interposed therebetween.

10. A pneumatic tire comprising:
a circumferential groove extending along a tire circumferential direction, a first land portion having a first wall surface which faces one side in a tire width direction of the circumferential groove, and a second land portion having a second wall surface which faces another side in the tire width direction of the circumferential groove, the circumferential groove, the first land portion and the second land portion being provided in a tread surface,
the first wall surface alternately having along the tire circumferential direction a first inclined surface portion which is gradually decreased in a height thereof toward the second land portion and runs into a bottom of the circumferential groove, and a first concave portion which is depressed in a direction away from the second land portion,
the second wall surface alternately having along the tire circumferential direction a second inclined surface portion which is gradually decreased in a height thereof toward the first land portion and runs into the bottom of the circumferential groove, and a second concave portion which is depressed in a direction away from the first land portion,
the first land portion having a first connection portion which enters the second concave portion and is gradually increased in a height thereof toward the second land portion so as to be integrally connected to the second land portion, and a first bottom surface portion which is interposed between the first inclined surface portion and the first connection portion and constitutes the bottom of the circumferential groove,
the second land portion having a second connection portion which enters the first concave portion and is gradually increased in a height thereof toward the first land portion so as to be integrally connected to the first land portion, and a second bottom surface portion which is interposed between the second inclined surface portion and the second connection portion and constitutes the bottom of the circumferential groove,
the first inclined surface portion and the second inclined surface portion being alternately arranged along the tire circumferential direction while overlapping with each other in the tire width direction, and a see-through region of the circumferential groove being formed between the first inclined surface portion and the second inclined surface portion, and the bottom of the circumferential groove being formed discontinuously between the first bottom surface portion and the second bottom surface portion,
wherein the first concave portion is depressed from a ridge line between a top surface portion of the first land portion and the first inclined surface portion in a direction away from the second land portion, and
the second concave portion is depressed from a ridge line between a top surface portion of the second land portion and the second inclined surface portion in a direction away from the first land portion.

11. The pneumatic tire according to claim 10, wherein the first inclined surface portion and the second inclined surface portion overlap with each other at a position equal to or more than 50% of a depth of the circumferential groove from a tread surface.

12. The pneumatic tire according to claim 10, wherein the first inclined surface portion and the second inclined surface portion overlap with each other at a position equal to or more than 80% of a depth of the circumferential groove from a tread surface.

13. The pneumatic tire according to claim 10, wherein the first bottom surface portion enters the second concave portion which gradually tapers as being away from the first land portion, the first connection portion is provided at a leading end of the second concave portion, the second bottom surface portion enters the first concave portion which gradually tapers as being away from the second land portion, and the second connection portion is provided at a leading end of the first concave portion.

14. The pneumatic tire according to claim 10, wherein the first land portion and the second land portion are constituted by a block which is comparted by a lateral groove.

15. The pneumatic tire according to claim 10, wherein the tread surface is provided with a pair of circumferential grooves each extending in a zigzag shape, and the first land portion and the second land portion are arranged between the pair of circumferential grooves.

16. The pneumatic tire according to claim 10, wherein the first inclined surface portion and the second inclined surface portion are arranged close to each other in the tire circumferential direction so as to be positioned to come into contact with each other.

17. The pneumatic tire according to claim 10, wherein the first inclined surface portion and the second inclined surface portion are adjacent to each other in the tire circumferential direction without the bottom of the circumferential groove interposed therebetween.

* * * * *